Nov. 26, 1968     C. S. COCKERELL     3,412,956

VEHICLE FOR TRAVELLING OVER LAND AND/OR WATER

Filed March 22, 1960     10 Sheets-Sheet 1

C. S. COCKERELL
INVENTOR

BY *Cameron, Kerkam & Sutton*

ATTORNEYS

Nov. 26, 1968     C. S. COCKERELL     3,412,956

VEHICLE FOR TRAVELLING OVER LAND AND/OR WATER

Filed March 22, 1960     10 Sheets-Sheet 2

C. S. COCKERELL
INVENTOR

BY Cameron, Kerkam & Sutton
ATTORNEYS

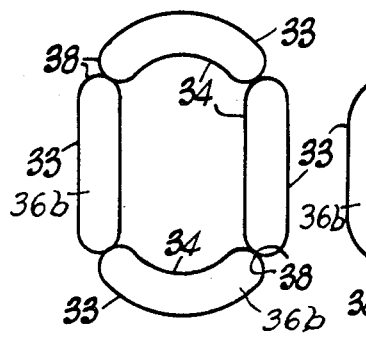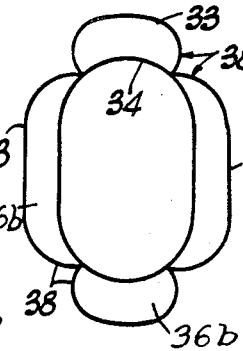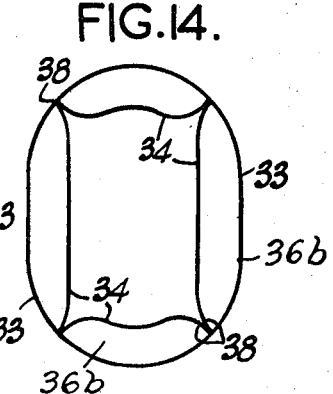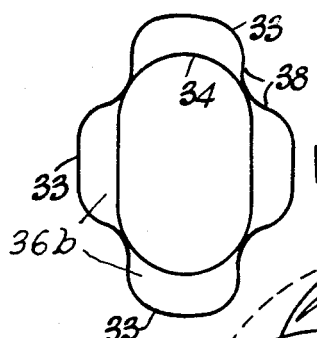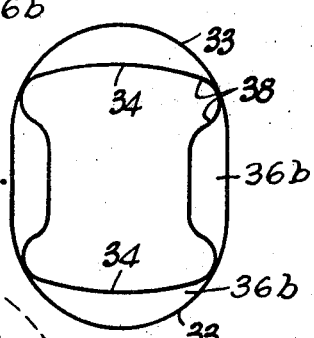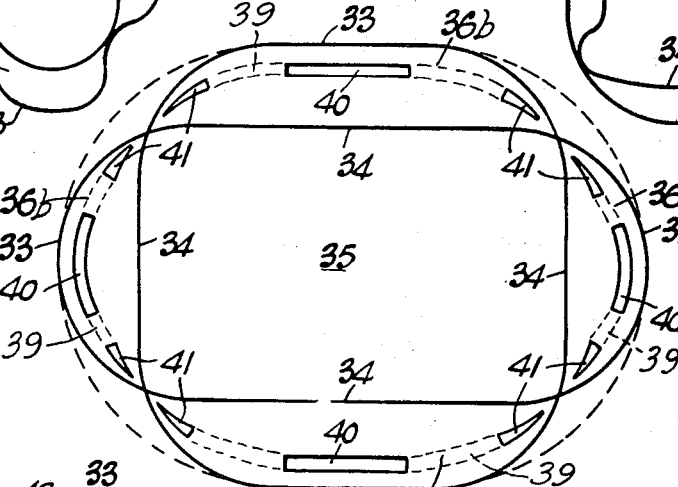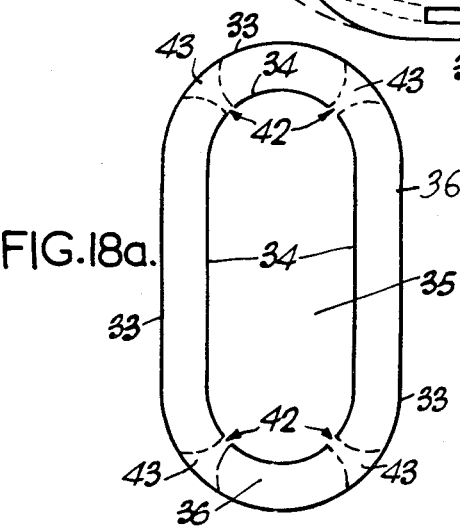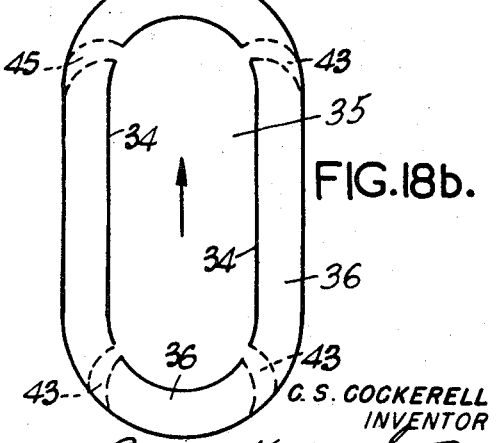

Nov. 26, 1968  C. S. COCKERELL  3,412,956
VEHICLE FOR TRAVELLING OVER LAND AND/OR WATER
Filed March 22, 1960  10 Sheets-Sheet 4

C. S. COCKERELL
INVENTOR

BY Cameron, Kerkam & Sutton
ATTORNEYS

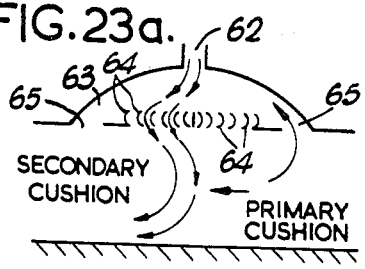
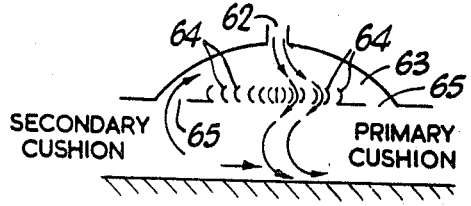
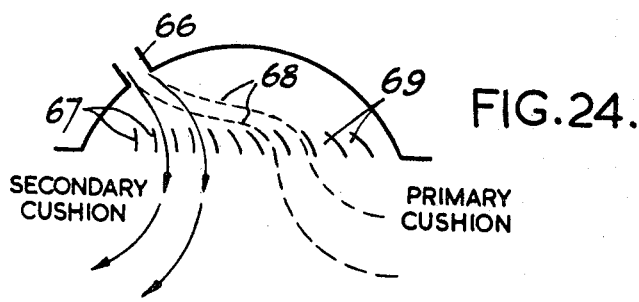
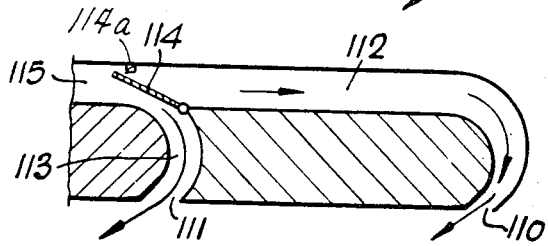
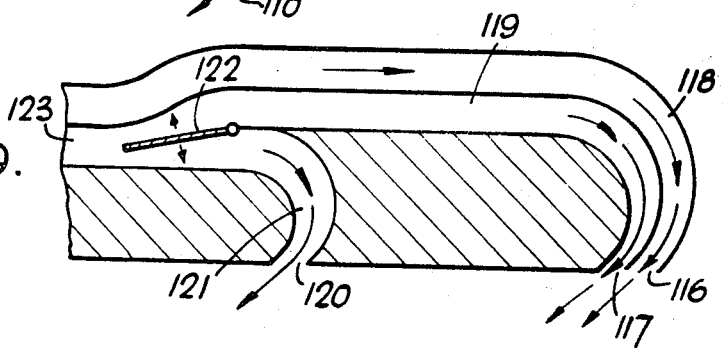
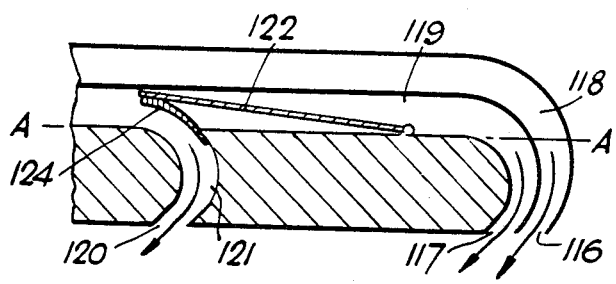

Nov. 26, 1968   C. S. COCKERELL   3,412,956
VEHICLE FOR TRAVELLING OVER LAND AND/OR WATER
Filed March 22, 1960   10 Sheets-Sheet 6
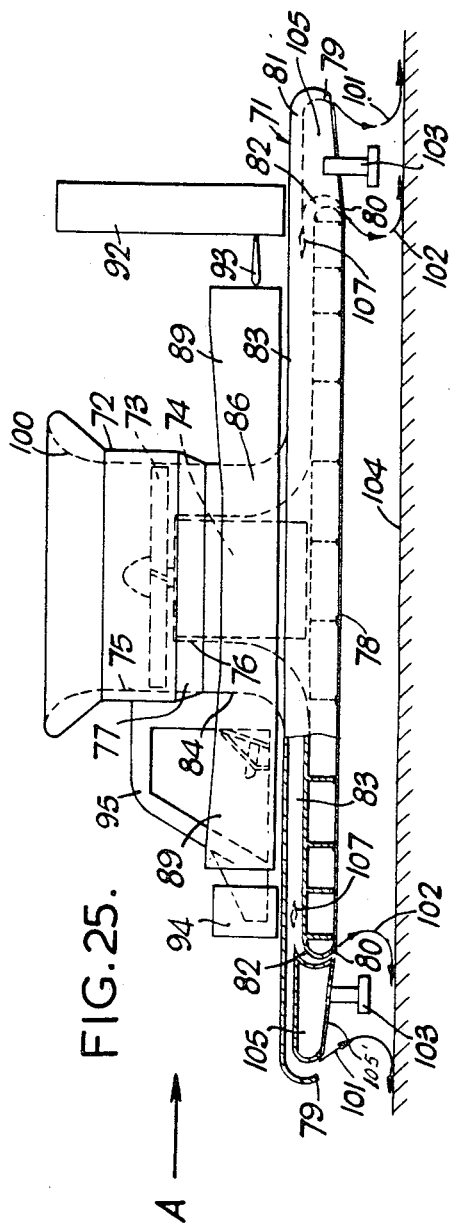
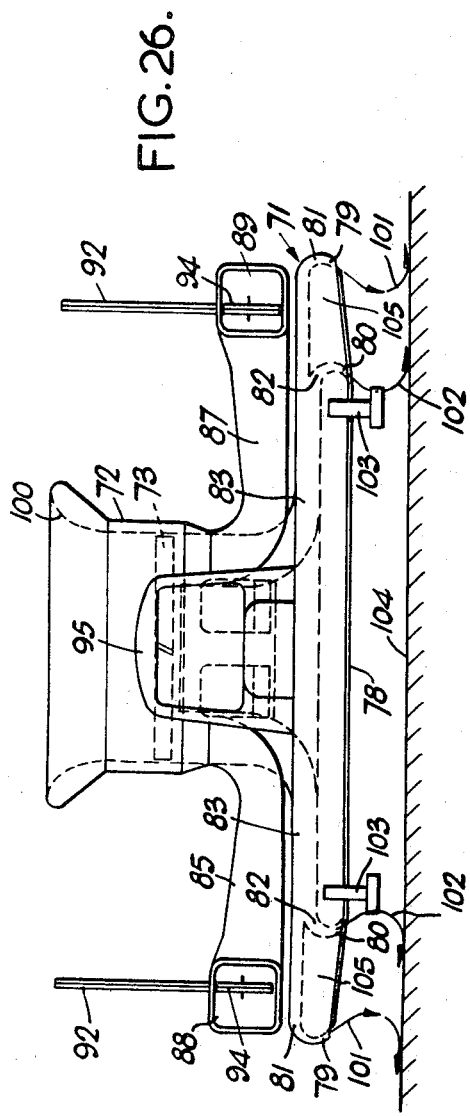
C. S. COCKERELL
INVENTOR
BY Cameron, Kerkam T Sutton
ATTORNEYS Nov. 26, 1968   C. S. COCKERELL   3,412,956
VEHICLE FOR TRAVELLING OVER LAND AND/OR WATER
Filed March 22, 1960   10 Sheets-Sheet 7

C. S. COCKERELL
INVENTOR

BY Cameron, Kerkam & Sutton
ATTORNEYS

Nov. 26, 1968  C. S. COCKERELL  3,412,956
VEHICLE FOR TRAVELLING OVER LAND AND/OR WATER
Filed March 22, 1960  10 Sheets-Sheet 9

C. S. COCKERELL
INVENTOR
BY Cameron, Kerkam & Sutton
ATTORNEYS

United States Patent Office 3,412,956
Patented Nov. 26, 1968

3,412,956
VEHICLE FOR TRAVELLING OVER LAND
AND/OR WATER
Christopher Sydney Cockerell, East Cowes, Isle of Wight, England, assignor to Hovercraft Development Limited, London, England, a British company
Continuation-in-part of applications, Ser. No. 627,925, Dec. 12, 1956, and Ser. No. 731,338 and Ser. No. 731,474, Apr. 28, 1958, both now abandoned. This application Mar. 22, 1960, Ser. No. 16,677
Claims priority, application Great Britain, Dec. 12, 1955, 35,656/55; May 2, 1957, 14,097/57, 14,098/57; Mar. 23, 1959, 9,900/59; Oct. 7, 1959, 34,037/59
40 Claims. (Cl. 244—2)

This application is a continuation-in-part of my applications; Ser. No. 627,925 filed Dec. 12, 1956, now Patent No. 3,363,716; and Ser. Nos. 731,338 and 731,474, both filed Apr. 28, 1958 and both now abandoned.

This invention relates to vehicles for travelling or hovering over land and/or water of the type described in co-pending application Ser. No. 627,925 filed Dec. 12, 1956, and is particularly directed to the stabilising of such vehicles when in operation.

The vehicle disclosed in the aforesaid application comprises means for discharging from the lower part of the body thereof at least one jet of fluid in such a way as to result in the formation and maintenance of a curtain which effectively encloses a space between the underside of the vehicle and the surface over which the vehicle is to operate, so that when the fluid discharge means are in operation a cushion of air or other gas is built up in said space to a pressure sufficient to support or assist in supporting the vehicle clear of the surface, the curtain acting after the manner of the walls of a pneumatic tire and serving to contain the built-up pressure of the cushion. The fluid discharging means are so arranged and operated that the total thrust produced by the jet or jets of fluid forming the curtain is substantially less than the total weight of he vehicle, a characteristic which renders such vehicles distinct from the more conventional types of vertical takeoff craft.

The same system of support is applicable to mobile platforms, and to aircraft and aircraft carriers such as those described in copending applications Ser. Nos. 731,338 and 731,474, both filed Apr. 28, 1958. The term "vehicle" as used herein is therefore to be understood as including, where the context permits, a mobile platform, an aircraft or an aircraft carrier.

In the vehicles of the aforesaid prior applications where the pressurised cushions of gas which support the vehicles are formed and contained by a single annular curtain of fluid, it was stated that the vehicles would tend to be unstable in that if one side of a vehicle is moved downwardly there would be no tendency for the vehicle to right itself. However, in each of the applications Ser. Nos. 627,925, 731,338 and 731,474, there was described and illustrated arrangements for providing stability by providing means for bringing about a stepped pressure distribution over at least part of the cushion which supports the vehicle, and the present invention in concerned with the carrying forward of, and the improvement of, the broad concept originally described and illustrated in said applications Ser. Nos. 627,925, 731,338 and 731,474.

According to the invention means are provided for bringing about a stepped pressure distribution over at least part of the cushion whereby, when the vehicle is deflected from its intended orientation, a restoring force is applied in a sense as to tend to restore the vehicle to its intended orientation.

A restoring force to right the vehicle can be made available by subdividing the supporting cushion and this can conveniently be done by ejecting fluid through one or more additional ports formed in the bottom of the vehicle, the ejected fluid forming and maintaining one or more further curtain to subdivide the cushion.

Alternatively, the supporting cushion can be compartmented by means of one or more structural members. The member or members can each be in the form of a thin keel-like projection from the bottom of the vehicle, or the bottom of the vehicle may be so shaped as to provide sufficient obstruction to compartment the cushion. Both structural members and fluid curtains may be used in combination.

The restoring force will have a larger righting action if it is applied adjacent to the periphery of the vehicle and this can readily be obtained by forming the additional curtain by fluid ejected from an additional or secondary annular port, or series of ports in an annular configuration, positioned inside but adjacent to the original or primary port or series of ports so as to provide an annular zone wherein is formed an annular cushion having a pressure intermediate between that of the main cushion pressure and atmospheric pressure. With this arrangement, if one part of the vehicle drops relatively to the remainder, the radius of curvature of the curtains at this point, and particularly of the outer curtain, decreases, with the result that the pressure of the annular cushion locally increases as compared with that in the diametrically opposite part of the vehicle, a righting moment being exerted on the vehicle. The local pressure difference is maintained by the surplus of air which results from the decreased height of the curtains.

The pressure increase produced by the local variation in height can be caused to disperse less readily by dividing the annular cushion into three or more compartments by the formation of further jets or curtains of fluid.

For convenience the outermost curtain system will be referred to as the primary curtain, while the innter curtain system will be referred to as the secondary curtain. The zone of pressure between the primary and secondary curtains will be referred to as the secondary cushion or cushions, the zone of pressure extending over the remainder of the underside of the vehicle and serving primarily to support it being called the primary cushion. It will be assumed for convenience in the following descriptions of certain embodiments of the invention that the curtain-forming fluid is air, although it can be another gas, such as engine exhaust gases or a liquid such as, for example sea water.

For a better understanding of the invention, and to show how the same may be put into effect, reference will now be made to the accompanying drawings wherein like reference characters indicate like parts and in which.

Figure 3:
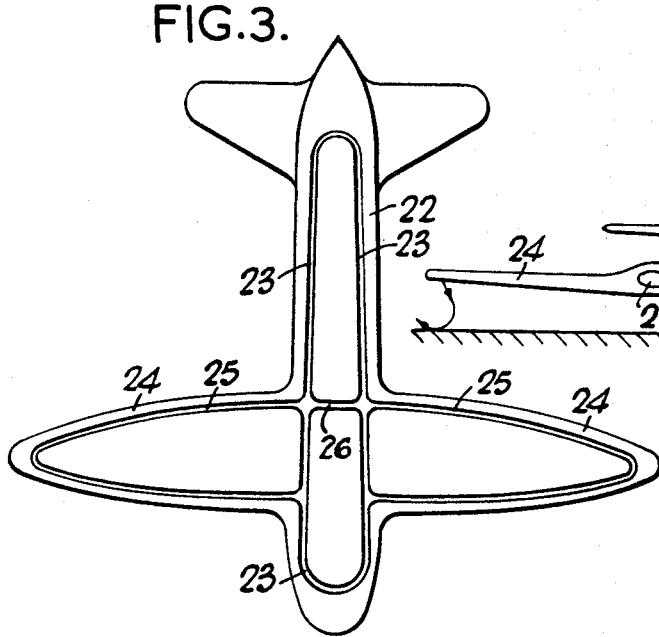
FIGURE 3 is an inverted plan view of an aircraft embodying the invention.
Figure 4:
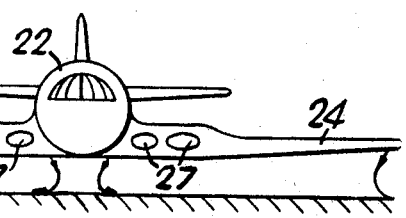
Figure 5:
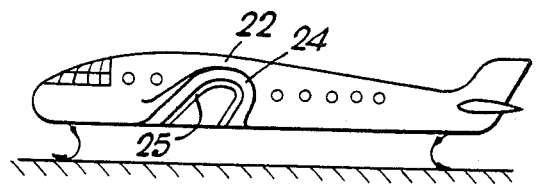
Figure 6:
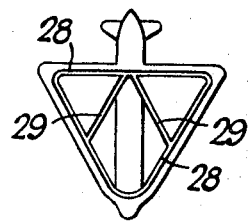
Figure 7:
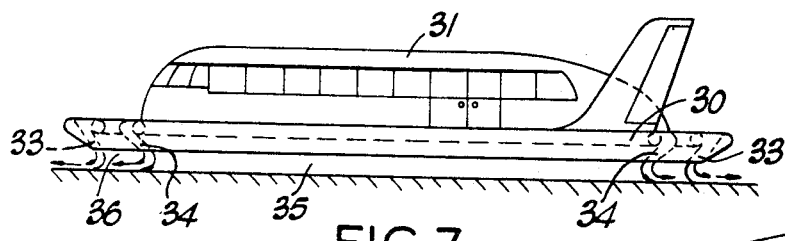
Figure 8:
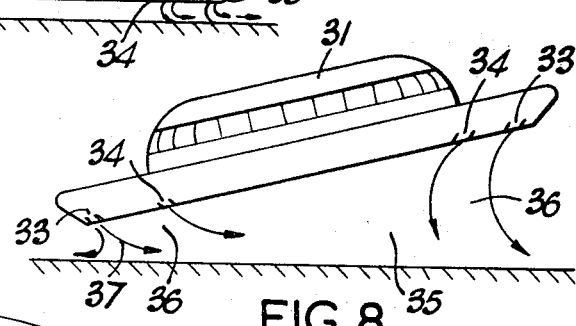
Figure 9:
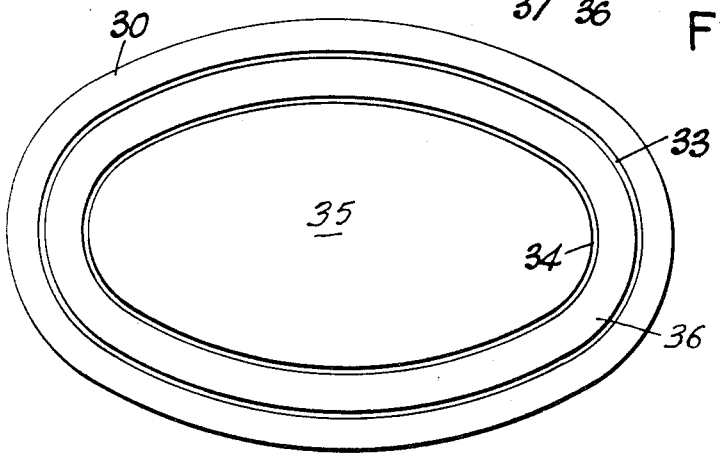
Figure 19A:
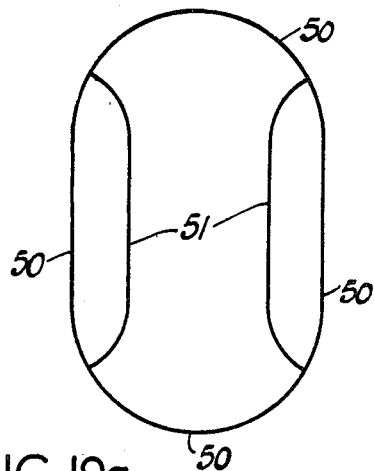
Figure 19B:
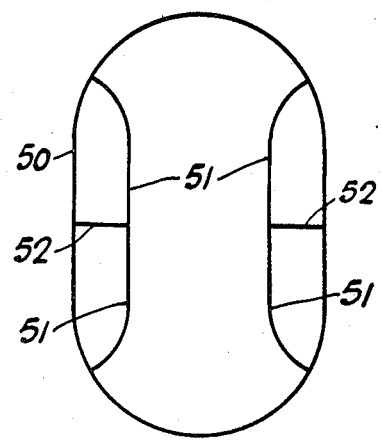
Figure 20:
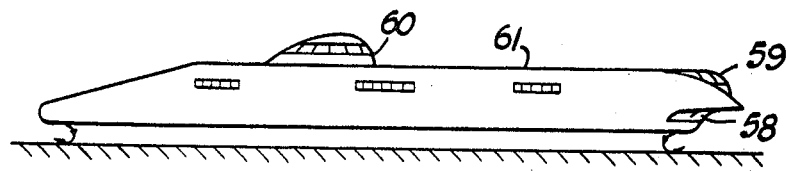
Figure 21:
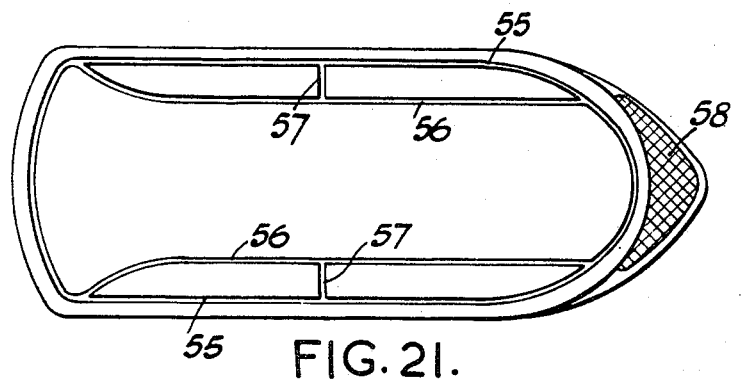
Figure 22:
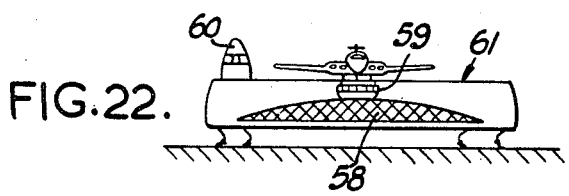

FIGURES 4 and 5 are front elevation and side elevation respectively of the aircraft illustrated in FIGURE 3, FIGURE 6 is an inverted plan view of a further aircraft embodying the invention, FIGURE 7 is a side elevation of a further vehicle embodying the invention, FIGURE 8 is a diagrammatic front elevation of the vehicle illustrated in FIGURE 7, showing one form of air flow when the vehicle is tilted, the tilting being shown to an exaggerated degree for clarity, FIGURE 9 is an inverted plan view of the vehicle illustrated in FIGURES 7 and 8, FIGURES 10 to 17 are diagrammatic inverted plan views of vehicles embodying the invention, illustrating various port configurations for obtaining compartmentation of the secondary cushion, FIGURES 18a and 18b are diagrammatic inverted plan views illustrating a further port arrangement, FIGURES 19a and 19b are diagrammatic inverted plan views of vehicles having further embodiments of the invention, FIGURE 20 is a side elevation of an aircraft carrier embodying the invention, FIGURES 21 and 22 are inverted plan view and front elevation respectively of the vehicle illustrated in FIGURE 20, FIGURES 23a and 23b are diagrammatic illustrations of a modification applied to an embodiment of the invention, FIGURE 24 is a diagrammatic illustration in a further modified form of the arrangement illustrated in FIGURE 23, FIGURES 25, 26 and 27 are side view (partially in section on the longitudinal axis of the vehicle), front view and plan view respectively illustrating in more detail a vehicle embodying a port arrangement as illustrated in FIGURE 5, FIGURE 28 is a diagrammatic partial cross section of a vehicle showing a further embodiment of the invention, FIGURE 29 is a further diagrammatic partial cross section showing a modification of FIGURE 28, FIGURE 30 is an alternative form of the embodiment illustrated in FIGURE 29.

Figure 31:
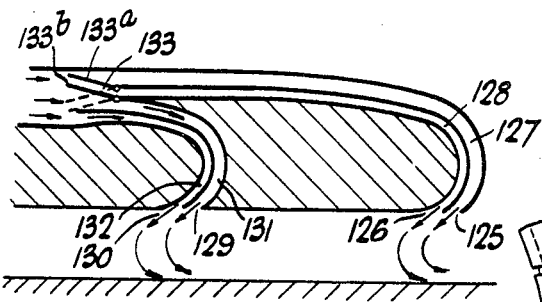
Figure 32:
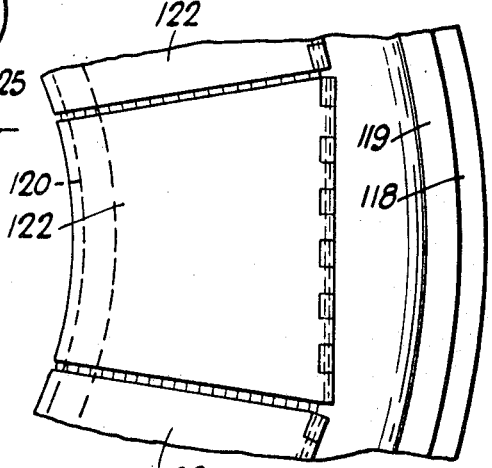
Figure 33:
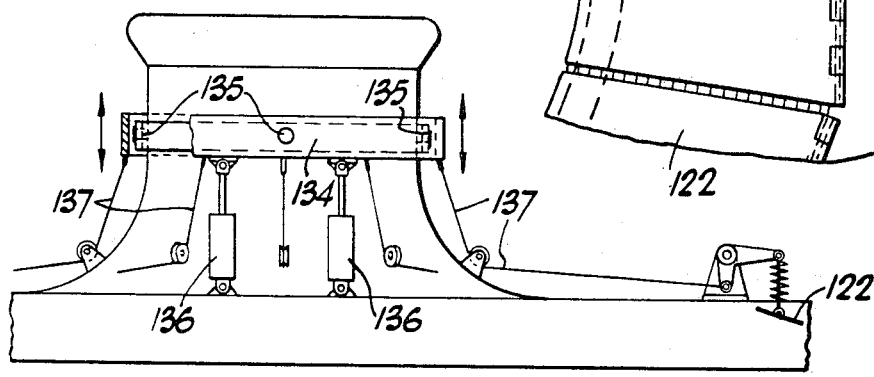
Figure 34:
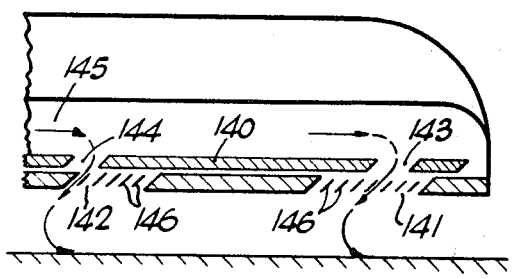
Figure 35A:
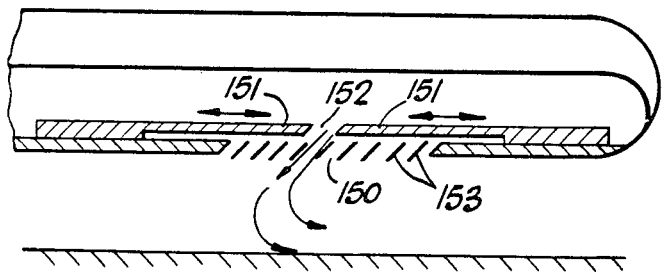
Figure 35B:
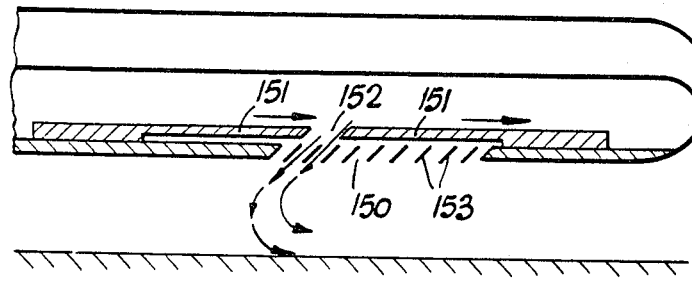
Figure 36A:
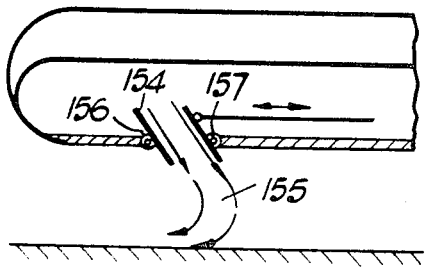
Figure 36B:
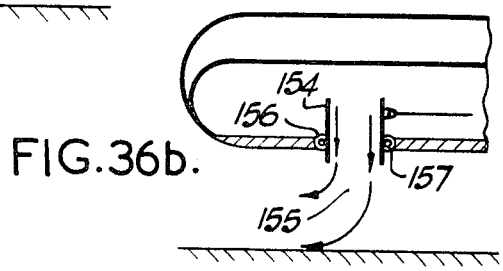
Figure 37:
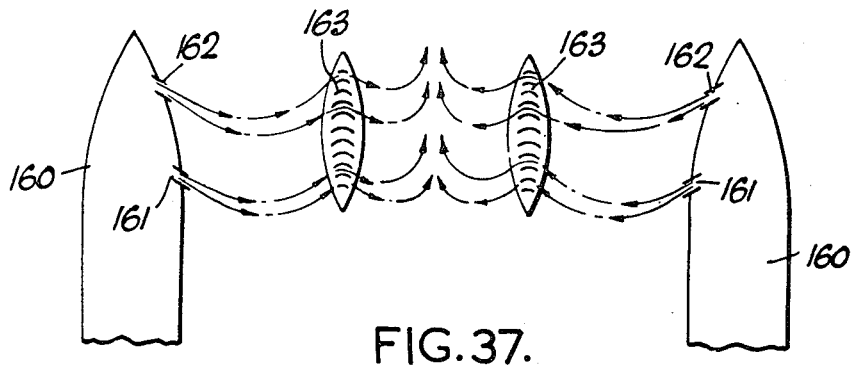
Figure 38:
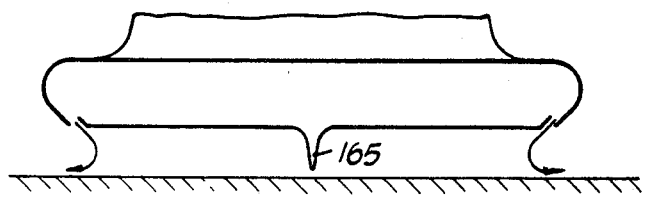
Figure 39:
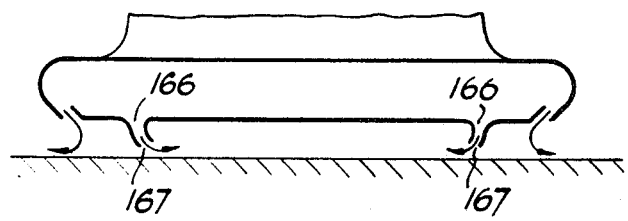
Figure 40:
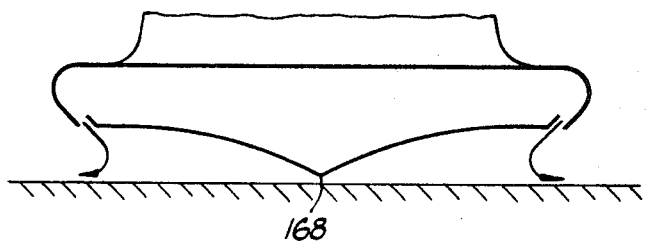

FIGURE 31 is a digrammatic partial cross section illustrating a further embodiment of the invention, FIGURE 32 is a partial plan view of the detail of a flap as used in the embodiments illustrated in FIGURES 28, 29, 30 and 31, FIGURE 33 is a diagrammatic illustration of a control system for controlling the flaps in FIGURES 28 to 32, FIGURE 34 is a diagrammatic partial cross section of a vehicle illustrating a further embodiment of the invention, FIGURES 35a and 35b are diagrammatic illustrations of another embodiment of the invention, showing means for varying the position of a curtain forming port in the bottom of a vehicle, FIGURES 36a and 36b are diagrammatic illustrations of a means for varying the ejection angle of a curtain forming port, FIGURE 37 is a digrammatic part plan view of a vehicle having horizontally flowing fluid curtains, FIGURE 38 is a diagrammatic vertical cross section of the bottom of a vehicle illustrating another embodiment of the invention, FIGURE 39 illustrates a modification of the embodiments illustrated in FIGURE 38 and, FIGURE 40 is a further diagrammatic vertical cross section of the bottom of a vehicle illustrating still another embodiment of the invention.

Figure 1:
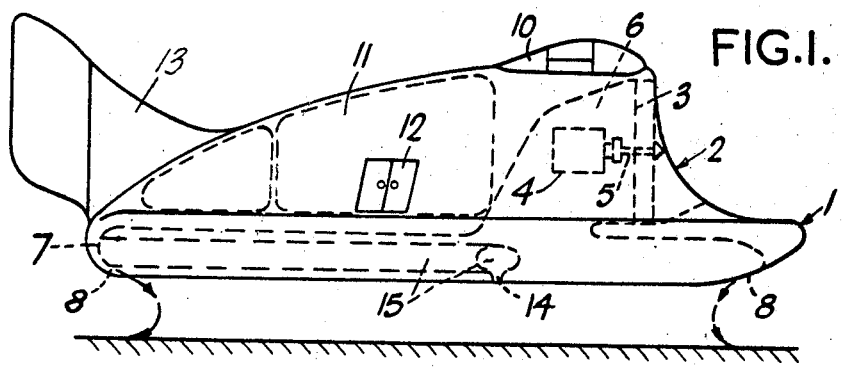
FIGURE 1 is a side elevation of a vehicle embodying the invention.
Figure 2:
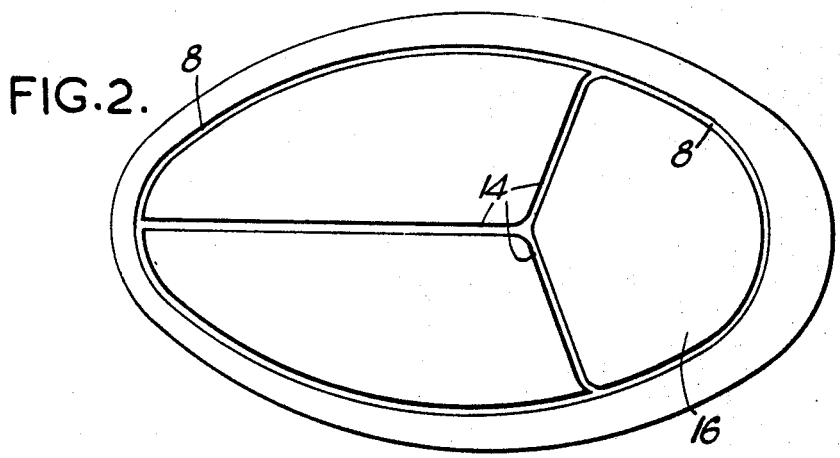
FIGURE 2 is an inverted plan view of the vehicle illustrated in FIGURE 1.

Referring to FIGURES 1 and 2 of the drawings, there is shown a vehicle 1 having a generally egg-shaped plan, being narrower at the rear end than at the front end and having a substantially flat bottom. At its front end, the vehicle has an opening 2 in which a double, four-bladed propeller 3 is mounted, the propeller being driven by a motor 4 through a shaft 5. The opening 2 leads into a chamber 6 formed in the vehicle, which chamber in turn communicates with a peripherally extending tunnel or duct 7. Formed in the bottom of the vehicle and communicating with the duct 7 is a mouth or port 8. A cockpit 10 is provided and there is a compartment 11 having access doors 12 for the carrying of goods. A tailplane 13 is fitted for assistance in steering the vehicle.

In operation air is ejected from the mouth or port 8 resulting in the formation and containment of a cushion of pressurized air beneath the vehicle, the vehicle being supported above the surface over which it is operating, as described in more detail in the aforesaid application Ser. No. 627,925. Turning now more particularly to FIGURE 2, it will be seen that the port 8 extends around the bottom of the vehicle adjacent to the periphery thereof. As stated above, if only this peripheral port 8 was provided with the vehicle having a substantially flat bottom, there is liable to be inadequate stability. To provide improved stability, at least to some extent, additional ports 14 are provided in the bottom of the vehicle. These ports 14 also communicate with the chamber 6 by means of ducts 7 and 15, and air is ejected through the ports 14 to form curtains which divide the cushion into compartments, so that a difference in pressure can exist beneath different parts of the bottom of the vehicle.

If, whilst operating, the front of the vehicle tilts downward the front section of the curtain formed from the port 8 will be bent through a smaller radius and there will be an increase in the pressure in the front compartment 16 of the cushion. Because, as is evident from FIGURE 2, the center of the pressure of the compartment 16 is forward of the transverse central axis of the vehicle body passing through its center of gravity, this increased pressure will provide a righting force which will tend to cause the front of the vehicle to rise to its original attitude. As described in the aforesaid application Ser. No. 627,925, vanes may be fitted in the port 8 and the ports 14 to provide a directional component to the air forming the curtains, which component can be used for providing propulsion and directional control of the vehicle.

FIGURES 3 to 6 illustrate further forms of compartmentation for application to aircraft, as described and illustrated in said copending application No. 731,474.

In the example shown in FIGURES 3, 4 and 5, one cushion of pressurised air is formed and maintained beneath the fuselage 22 of the aircraft by curtains of air ejected through a port 23 formed in the bottom of the fuselage and defining a substantially cigar-shaped area. Beneath each wing 24 a further cushion of pressurised air is formed and maintained by curtains of air issuing from peripherally extending ports 25. The cushion extending beneath the fuselage 22 is divided by a curtain of air issuing from a further port 26. In operation air is drawn in by the engines of the aircraft through intakes 27 and is ejected through the ports 23, 25 and 26. The operation of such an aircraft is more fully described in the said application Ser. No. 731,474. The compartmentation of the cushion beneath the fuselage and the cushions beneath the wings act in the same manner to provide stability as described above in connection with FIGURES 1 and 2.

FIGURE 6 illustrates a port configuration for application to a delta wing aircraft, being somewhat similar to the example shown in FIGURE 2. The compartmentation of the cushion formed and maintained by the curtains issuing from the peripheral port 28 is obtained by the curtains of air issuing from the ports 29, and the stabilising effect is as described above.

FIGURES 7, 8 and 9 show an alternative form of vehicle in which the cushion is in the form of a primary section surrounded by a secondary annular section at a pressure, during normal operation, intermediate between the primary cushion pressure and atmosphere. The vehicle has a base portion 30 which carries a passenger and/or a freight carrying portion 31. The portion 31 may also contain the engines driving the air compressors which supply the air for forming the curtains. As will be seen in FIGURE 9 the bottom of the vehicle has two ports 33 and 34 the outer or primary port 33 being adjacent to the periphery of the base 30 of the vehicle and the inner or secondary port 34 being spaced inwardly from and substantially parallel to the primary port. A form of vehicle having two such concentric port arrangements is described in more detail below in connection with FIGURES 25, 26 and 27.

When in operation, air curtains are formed by air issuing from the ports 33 and 34 and form and maintain a primary cushion 35 and a secondary annular cushion 36. The pressure of the annular cushion 36 is intermediate between that of the primary cushion and atmosphere.

If the vehicle for any reason tilts, as shown to an exaggerated degree in FIGURE 8, the radius of curvature of the primary curtain formed by port 33 decreases at that part of the vehicle which approaches the surface so that the pressure of the secondary cushion increases locally. The increase in pressure in the secondary cushion tends to cause a local splitting of the inner or secondary curtain so that it tends to flow inwards.

Further inclination of the vehicle causes all the air forming the secondary curtain to flow inwards and a part of the air forming the outer or primary curtain also splits off from the main curtain flow to form an inwardly directed jet 37, as shown.

If the inner or secondary curtain is directed horizontally inwards as it leaves the bottom of the vehicle, it cannot sustain an increase in pressure of the secondary cushion to a pressure above that of the main cushion, as the curtain can only sustain a pressure which is directed against its convex face. Hence the maximum righting moment is that obtained by increasing the secondary cushion pressure until it is substantially equal to that of the primary cushion.

If, however, the secondary curtain is directed vertically downwards as it leaves the vehicle, it will be deflected outwards by the excess of the primary cushion pressure over the secondary cushion pressure until such time as a local lowering of the vehicle causes the secondary cushion pressure to rise above that of the primary cushion, whereupon the secondary curtain will be deflected inwards. Thus by directing the secondary curtain vertically downwards a larger restoring or righting moment can be produced and the stability of the vehicle is improved, but at the expense of efficiency, as the inwardly directed jet is the more efficient from the point of view of power required to raise the vehicle a given height.

The effect just mentioned is progressive as the initial direction of the secondary curtain varies from the horizontal to the vertical. It is therefore advantageous to effect a compromise between maximum stability and maximum efficiency by directing the jet at an intermediate angle between 30° and 60° to the horizontal.

Figure 10:
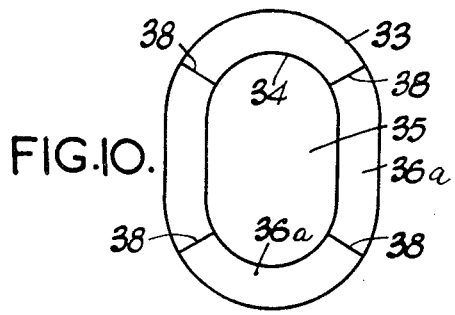
Figure 11:
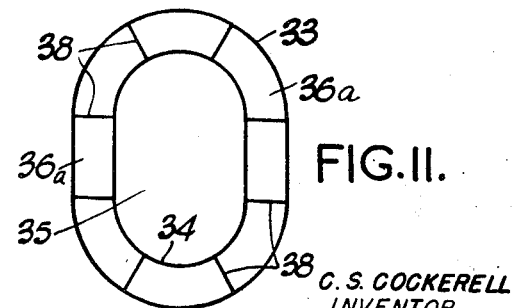

The local increase in pressure of the secondary cushion can be prevented from dispersing to the remainder of the secondary cushion, with a consequent increase in the stabilising effect by dividing the annular secondary cushion 36 between the curtains issuing from ports 33 and 34 into compartments 36a as shown in FIGURES 10 and 11, or by forming a secondary cushion composed of separate compartments 36b by various configurations of either the primary port 33, the secondary port 34 or both, as shown diagrammatically in FIGURES 12 to 17.

In FIGURES 10 and 11 radial ports 38 are formed in the bottom of the vehicle and connect the primary and secondary curtain ports 33 and 34. Four radial ports 38 are shown in FIGURE 10 and eight in FIGURE 11, the number of ports being variable and depending on size of vehicle, the degree of stability required and other parameters. The ports 38 may be arranged to deliver the air vertically or some horizontal component of direction may be given to the air for propulsion purposes or the like.

In order to avoid sharp intersections of jets or curtains, such as are shown in FIGURES 10 and 11, the configurations shown in FIGURES 12 to 17 may be used. It will be seen that the ports 38 of FIGURES 10 and 11 of generally radial orientation are constituted in FIGURES 12 to 17 by part of the secondary curtain port, by part of the primary curtain port, or both. In FIGURE 17 the compartmentation of the secondary cushion is formed by the intersecting of two continuous ports.

Of the configurations of FIGURES 12 to 17, FIGURES 13, 15 and 17 give rise to the least trouble from cross flow between compartments. Other considerations affecting the choice of configuration are as follows: If the radius of curvature of any port is too small in relation to the hover-height of the vehicle there is a danger that the flow pattern may switch locally to a mode in which the secondary jet or part thereof clings to the underside of the vehicle. This mode causes a local loss of lift, since it is characterised by a low positive, or even a negative, lift. With curtain-forming jets at an angle of 45° to the horizontal and at a cruising hover-height of 1.5 ft. and a maximum hover-height of 3.0 ft. when traveling over the troughs of waves, the minimum radius of curvature is of the order of 3 ft. if switching to the undesirable mode just mentioned is to be avoided. From this point of view the arrangements of FIGURES 13 and 14 are preferred.

Another arrangement characterised by low radii of curvature is that of FIGURE 17. On the other hand the small acute angles at which the curtains intersect produce a similar effect to that of ports of small radius of curvature, since entrainment in the space between the curtains is likely to occur where the curtains are close to each other. This entrainment leads to a low-pressure area between the curtains and a loss of lift. The difficulty can, however, be mitigated by providing ports 40 in the spaces in which the curtains are adequately separated and connecting them by ducts 39 in the vehicle with ports 41 in the space where the curtains approach undesirably close to each other, whereby a measure of pressure equalisation is brought about.

Yet another method of compartmenting the secondary cushion 36, as shown in FIGURES 18a and 18b, is to blank off the inner or secondary curtain port 34 at appropriate points 42 around its circumference. This has the effect of causing gaps to be formed in the secondary curtain which will cause air from the primary cushion to be ejected through the gaps in the secondary curtain to form curtains extending across the secondary cushion as at 43 in FIGURE 18a. When, due for example to the front tipping down or to a head pressure formed by the forward motion of the vehicle, the pressure in the front compartment increases then the curtains formed by the air issuing through the gaps in the secondary curtain will be deflected as shown in FIGURE 18b. Pressure increases in any of the other secondary cushion compartments will cause other deflections of the dividing curtains. Where the secondary curtain issues from the port 34 without any horizontal component other than one inwards towards the primary cushion 35, then of course the dividing curtains formed through the gaps will be vertical. However, if the secondary curtain air is given a further horizontal directional component such as by vanes (not shown) in the port 34, then the gap in the secondary curtain, and thus also the dividing curtains, will not be vertical.

When a vehicle according to the invention is in motion, the stagnation pressure in front and the suction pressure behind may bring about an increased pressure in the front compartment of the secondary cushion, and/or a reduced pressure in the rear compartment, thus causing the vehicle to adopt a "nose-up" attitude especially at speed. This pressure differential between the front and the rear of the vehicle differs from that occurring due to a variation in attitude due to transient effects or to variations in trim due to load. The differential due to the forward motion is a steady one and it is necessary, if it is desired to avoid a continuous "nose-up" attitude, to bring about some pressure equalising between front and rear. However in order to retain fore and aft stability it is necessary that the equalising of pressures between front and rear should not be so quick in operation that the pressure variations due to vertical movements of the front or rear due to transient effect are equalised before a restoring force has caused the vehicle to assume its correct attitude.

The rate at which flow can take place between the front and the rear of the vehicle is dependent to a substantial degree, upon the cross section of the path along which it flows, and upon the distance it has to flow. The cross section of the flow path is a function of cushion width and cushion height; thus in a vehicle which is long compared to the cushion width or height, or combination of both, the above problem of pressure equalising is not so difficult. Any steady pressure build-up due to forward speed is able to balance out, to a substantial degree, over a short period of time. The pressure variation due to transient up or down movements of the front or rear of the vehicle comprises two components, an initial greater pressure variation which occurs on the initial movement and a following comparatively smaller pressure variation which remains as long as the variation in altitude of the vehicle remains. The initial greater pressure variation will be prevented from dispersing too quickly and will provide an initial righting moment, while the following smaller pressure variation will also persist due to the restricted cross section of the flow path.

In vehicles which are shorter compared with the cushion width or height, or combination of both, such as those having a more square or rounded plan form, the effect described above for the comparatively long vehicles can be obtained to some extent by forming inner secondary curtains spaced from the primary curtain, the secondary curtains only extending along the sides of the vehicle and not across the front and the rear of the vehicle. The secondary curtains result in the formation of secondary cushions which themselves have a restricted cross section and also restrict the cross section of the primary cushion. FIGURE 19a illustrates diagrammatically the port arrangement for such a vehicle. The primary curtain is formed by air issuing from a port 50 formed in the bottom of the vehicle and adjacent to the periphery thereof. Two further ports 51 are formed in the bottom of the vehicle spaced inwardly towards the centre line of the vehicle and being substantially parallel to the ports 50 and extending in a fore and aft direction. At their front and rear ends the ports 51 curve round and outwards and join with the ports 50. In operation air is fed to the ports 50 and 51, the air issuing from the ports in the form of curtains, a cushion of pressurised air being formed and maintained beneath the vehicle by the action of the curtains. The curtains issuing from the ports 51 divide the cushion into compartment, but at the same time allow any steady pressure build up at the front of the vehicle to be equalised by allowing a flow of air from the front to the rear. At the same time, these curtains create restricted path for flow of air from front to rear, or vice versa, both in primary and secondary cushions so that although a steady pressure rise can be balanced out, there is sufficient restriction offered to any such air flow caused by pressure differences occurring between the front and the rear of the vehicle due to any unwanted transient pitching movements. The curtains formed from ports 51 therefore provide one end of the vehicle, and also provide roll stability by the forming of compartments in the cushion. Further stabilising can be obtained by sub-dividing the cushion compartments formed by the ports 51, by further transverse curtains formed by ejecting air from ports 52 as shown in FIGURE 19b.

FIGURES 20, 21 and 22 illustrate the application of a curtain system, similar in most respects to that shown in FIGURE 19b, to an aircraft carrier. In operation, air is ejected from a port 55 to form a primary curtain generally around the periphery of the bottom of the carrier. Two further ports 56 are formed in the bottom of the vehicle being substantially parallel to and spaced inboard of the port 55. The ports 56 connect at each end with the port 55 and air is ejected from them to form a secondary curtain. Further transverse ports 57 are also formed, air being ejected from these ports to divide the cushion formed between the ports 56 and 55. The aircraft carrier has an air intake 58 at the front. A cockpit 59 and a control tower 60 are also provided and the flat top surface provides a deck 61 for the landing and take-off of aircraft. The operation of such a vehicle is described more fully in the said copending application Ser. No. 731,338 and will not be described further herein.

In such a vehicle as illustrated in FIGURES 20, 21 and 22, it is obvious that when travelling at a speed sufficient for the landing and taking-off of aircraft, a considerable head or static pressure will be built up at the front of the vehicle and will result initially in an increase in pressure of the cushion at the front. Due to the secondary curtains being formed only along the sides of the carrier, there is direct communication between the front and the rear portions of the primary cushion, although this communication is restricted by the narrowing of the available path by the secondary curtains. A steady build up of pressure due to speed, as described above, can therefore slowly balance out by a flow of air occurring along the centre of the carrier. Any comparatively sudden increase in pressure however, due to a pitching movement of the carrier, will not be able to balance out quickly, and a righting force will occur. Similarly any rolling movement of the carrier, will cause a pressure rise in one or other of the secondary cushions at the sides of the carrier and a righting force will be obtained. The sub-division of the secondary cushions by the transverse curtains issuing from the ports 57 assists in the pitch stability of the carrier, although as described above, when the length of the vehicle is long compared with the height and/or the width of the cushions, these transverse curtains may not be necessary.

FIGURES 23a and 23b illustrate arrangements for improving the efficiency of a curtain, particularly a secondary curtain, from a stability point of view. As stated previously, a vertical curtain gives increased stability but loses efficiency due to easier deflection by the cushion pressure, that is the curtain can only support or contain a lower cushion pressure. The secondary curtain port 62 is formed in a recessed chamber 63 formed in the bottom of the vehicle. Level with the bottom of the vehicle, in the form of a diaphragm across the chamber are two sets of vertical vanes 64, the vanes extending either side of a central position in line with the port 62. The vanes are curved in their vertical cross section, the radius of curvature varying from a minimum for the vanes at the outside of each set, i.e., those closest to the lower edge of chamber 63, to a maximum at the centre, beneath the port 62, the concave sides of one set of vanes facing the concave sides of the other set. Ports 65 are provided in the diaphragm, situated outside the outermost vane of each set and connecting the chamber 63 with the space beneath the vehicle, so that the cushion pressures can act on the curtain as it issues from the port 62, as indicated by the arrows entering ports 65 in FIGURES 23a and 23b. FIGURE 23a shows the normal operation of the system. The curtain issues from the port 62 and is deflected by the primary cushion pressure $P+p$. The curtain is then deflected by the left hand set of vanes 64 and is curved round and issues with a direction towards the primary cushion which increases its efficiency. When a local lowering of the vehicle occurs, as shown in FIGURE 23b, the secondary cushion pressure increases and becomes, for example $P+p$. This pressure acts on the curtain issuing from the port 62 and deflects it, as shown. The curtain is then deflected by the right hand set of vanes 64, issuing in a direction towards the secondary cushion. The curtain thus issues from the vanes in a direction towards the higher cushion pressure, whichever it may be, and is able to support a greater pressure, or pressure difference.

FIGURE 24 is a modification of the arrangement shown in FIGURES 23a and 23b. Normally the secondary curtains in configurations such as are shown in FIGURES 9 to 19b and 21, are caused to issue with a direction towards the primary cushion. This is because normally the secondary curtain or curtains for most of the time will be operating to contain the primary cushion and only for a comparatively small portion of the time will they be affected by the stabilising forces. FIGURE 24 is, therefore, an arrangement in which the port and vanes are arranged to provide for a maximum efficiency in one direction. The curtain issues from port 66 with a direction towards the primary cushion, little or no deflection of the curtain being caused by the vanes 67, thus avoding losses. As the pressure difference between the primary and secondary cushions decreases however, the curtain is deflected less by the primary cushion, until, when the secondary cushion pressure is greater than the primary cushion pressure, the curtain is deflected as shown by the dotted lines 68 and flows through vanes 69 which are so curved as to have a strong deflecting action on the curtain. The curtain issuing from these vanes may be deflected to the extent that it issues in a direction towards the secondary cushion and in these circumstances, is thus able to support a larger increase in pressure of the secondary cushion over the primary cushion.

An improvement in stability can also be obtained by providing that, when the vehicle is in a horizontal position, the outer or primary curtain port is higher than the inner or secondary curtain port with reference to the surface over which the vehicle is to hover or travel. If there is a local variation in height, so that a part of the vehicle approaches the surface, the ratio of the height of the secondary curtain to that of the primary curtain increases at this locality. As a result the local pressure of the secondary cushion between the primary and secondary curtains can build up to values greater than would be the case if the ports were of equal height with the vehicle in the horizontal position. Such a vehicle is illustrated in FIGURES 25, 26 and 27.

Figure 27:
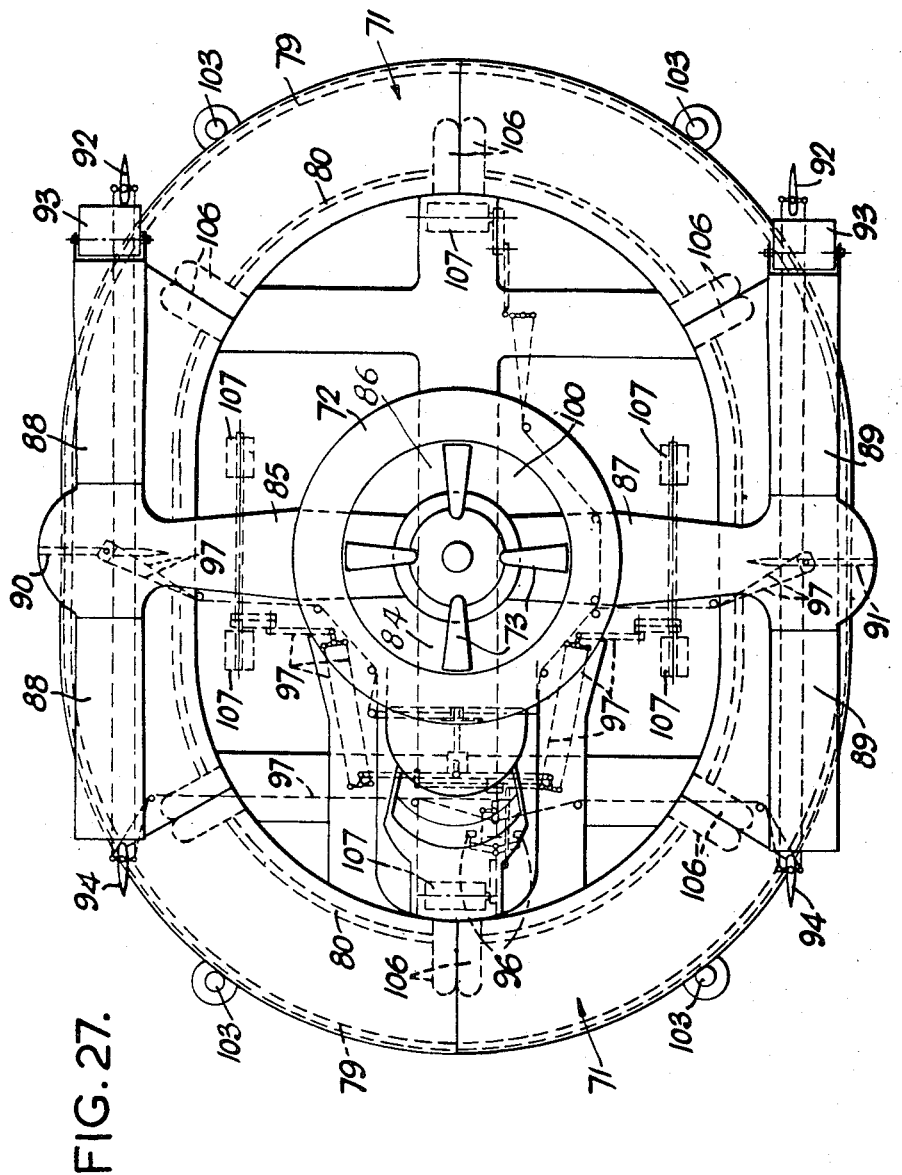

The operation of the vehicle illustrated in FIGURES 25, 26 and 27 is similar in most respects to that of the vehicle illustrated in FIGURES 7, 8 and 9.

The vehicle comprises a base portion or platform 71 of a somewhat oval plan form in the centre of which there is mounted a hollow circular member 72. Within the hollow member 72 there is a single stage compressor 73 and its driving motor 74. Formed immediately below the compressor between the wall 75 of the hollow member 72 and a casing 76 around the motor 74 is an annular duct 77.

Formed in the bottom surface 78 of the platform 71 and extending around the periphery thereof is an annular port 79. A further port 80 is also formed in the bottom surface 78, concentric with and within the annular port 79. The ports 79 and 80 are connected by ducts 81 and 82 respectively to a chamber 83 within the platform 71. The annular duct 77 divides into four arcuate ducts 84, 85, 86 and 87. The ducts 84 and 86 connect to the chamber 83, while ducts 85 and 87 continue sideways, one to each side of the vehicle and connect to longitudinal propulsion ducts 88 and 89 of rectangular cross section, positioned one on each side of the vehicle, extending in a direction parallel to the fore and aft or longitudinal axis of the vehicle. At the junction of the ducts 85 and 87 with the respective propulsion duct 88 or 89, there are positioned rotary valves 90 and 91 the function of which is described below. Positioned at the rear ends of the propulsion ducts are rudder members 92 and control surfaces 93, while further rudder members 94 are positioned at the front ends of the propulsion ducts.

Situated in front of the circular member 72, on the top of the platform 71, is a cockpit or similar enclosure 95, in which is seated the pilot etc. Controls 96 in the cockpit 95 provide means for controlling the movement of the rudders 92 and 94, control surfaces 93, flaps 107 and the rotary valves 90 and 91, by means of suitable linkages 97. Engine controls are also provided in the cockpit in the conventional manner.

The vehicle operates as follows. When the motor 74 is started, air is drawn in through intake 100 and forced into the annular duct 77 by the compressor 73. Some of the air passes through ducts 84 and 86 into the chamber 83. From this chamber the air flows through ducts 81 and 82 to the annular ports 79 and 80. The air, in the form of a primary curtain 101 and a secondary curtain 102, is expelled from the annular ports inwardly towards the centre of the vehicle. As a pressure builds up beneath the vehicle, the curtains of air are deflected. The pressure of the air beneath the vehicle rises still further until the pressure acting on the bottom surface 78 is sufficient to lift the vehicle. as the pressure of the fluids increases to the value required to lift the vehicle, the air curtains are further deflected to a position where, when seen in vertical section as shown by lines 101 and 102 in FIGURES 25 and 26, the curtains will follow curved paths with a mean radius of curvature equal to about half the height of the bottom of the vehicle from the ground and with centres of curvature disposed outside the curtains and substantially vertical beneath the respective annular ports 79 and 80. The pressure within the curtains can build up rapidly to a point where the vehicle is supported upon the air trapped within the curtains so that the vehicle is sustained over the ground upon an air cushion as effectively as though the vehicle were resting upon a balloon tire. The cushion is in two parts a primary cushion and an annular secondary cushion, the pressure of the latter being intermediate between that of the primary cushion and atmosphere.

The remainder of the air in the annular duct 77 passes through ducts 85 and 87 to the propulsion ducts 88 and 89. The pilot can vary the position of the rotary valves 90 and 91 so as to control which way the air will flow in the propulsion ducts. Both valves may be positioned so that all the air will be expelled out of the rear ends of the propulsion ducts thus propelling the vehicle forwards. Similarly the valves may be positioned so that all the air will be expelled out of the front ends of the propulsion ducts, thus propelling the vehicle rearwards. Intermediate positions of the valves will determine the relative flow out of each end of each propulsion duct and the resultant forward or rearward speed. The valves 90 and 91 may also be used differentially so that air flows out of the rear of one propulsion duct and the front of the other or vice versa thus turning the vehicle about its centre. A combination of these two methods of moving the valves will provide both propulsion and turning.

Additional turning control is obtained by rudders 92 and 94. All of the front rudders 94 and the lower parts of the rear rudders 92 are in the stream of air flowing from the propulsion ducts and are acted upon by that air depending upon the particular pattern of air flow at any one instant. The top portion of the rear rudders 92 is acted upon by the air flow created by the movement of the vehicle and any other air flow such as the wind, in the normal manner.

As an aid to the initial forming of the air curtains and the enclosed cushion of pressurized air, when operating from a firm surface, the vehicle may be supported a short distance off the ground by supports 103. When the motor is started, the air curtains will be expelled in an inwards direction so that they impinge upon the ground, enclosing a space between the surface 104 and the bottom 78 of the vehicle. As previously described, a cushion of pressurised air will rapidly build within this space until it supports the vehicle off the surface, the air curtains being deflected to a final shape as described above.

The bottom surface of the vehicle between the ports 79 and 80 is slanted upwards so that the port 79 is higher than port 80. As explained above, with such a construction, if, for example, the rear of the vehicle was to approach closer to the surface, as by tilting of the vehicle the ratio of the height of the secondary curtain from port 80 to that of the primary curtain from port 79, increases. This enables the pressure of the secondary cushion to be built up to a higher pressure than would otherwise be the case. Slanting, as at 105, of the outer portion of the bottom surface is also advantageous for vehicles for use over water in that it affords some hydrodynamic lift to the vehicle.

The bottom of the vehicle is conveniently made watertight to act as a flotation member and the annular portion 105 between the ports 79 and 80 is also watertight for additional buoyancy. This annular portion 105 is attached to the main body of the vehicle by brackets 106. These brackets pass across the duct 82 supplying the port 80 and the port is blanked off at these positions. Air flows from the ducts 84 and 86 to the side portions of the port 79, so that a complete curtain is formed around the periphery of the vehicle.

Flaps 107 are positioned in the chamber 83 to alter locally the flow of air to the ports 79 and 80. The flaps are operated independently by the pilot, and by rotating one of the flaps to a position in which it obstructs the air flow to the corresponding parts of the curtains, partial attenuation of these parts of the curtains occurs. This attenuation results in a local weakening of the curtains within the region of the flap being operated and a local decrease in pressure both of the primary and secondary cushions. By this means the pilot is able to control, and vary at will, the attitude of the vehicle relative to the surface over which it is operating.

It will be apparent from the foregoing description and the showings of the drawings that in each of the embodiments of the invention illustrated in FIGURES 1–4, 10–17, 18a–18b, 19b, 20–22 and 25–27, the vehicle-supporting cushion is subdivided into a plurality of gas-containing compartments wherein different gas pressures can be produced, at least two of said compartments having their centres of pressure positioned on opposite sides of the fore and aft centre line or axis of the vehicle passing through the centre of gravity thereof, and at least two of said compartments having their centres of pressure positioned on opposite sides of the transverse centre line or axis passing through the centre of gravity of the vehicle, whereby the production of different pressures in said compartments exert stabilising forces on the vehicle in both roll and pitch. For example, in FIGURES 1 and 2, the two compartments to the rear of front compartment 16 have their centres of pressure positioned on opposite sides of the fore and aft centre line of the vehicle and also have their centres of pressure positioned on the opposite side of the transverse centre line from the centre of pressure of front compartment 16. In FIGURES 10–17, there are also at least two compartments 36a or 36b which have their centres of pressure on opposite sides of the fore and aft centre line, and at least two which have their centres of pressure on opposite sides of the transverse centre line.

It is possible, in vehicles having two curtain systems as described herein, to provide means for altering the trim of the vehicle. This may be accomplished by diverting part of the air which would otherwise flow to the inner curtain, to the outer curtain or vice versa, thus bringing about an increase or decrease in the secondary cushion pressure at that location, so that the relevant part of the vehicle tends to rise or fall. Various methods of carrying this out are shown in FIGURES 28 to 32.

FIGURE 28 shows a simple arrangement in which two ports 110 and 111 are supplied with air by ducts 112 and 113 respectively. A hinged flap 114 is mounted at the junction of the two ducts 112 and 113, the position of the flap controlling the amount of air fed from a compressor via duct 115 which enters each of the ducts 112 and 113. By rotating the flap one way, anti-clockwise in FIGURE 28, the amount of air flowing to the inner curtain is reduced and that flowing to the outer curtain is increased. This leads to a local increase in pressure of the secondary cushion and an upward force on the bottom of the vehicle. Reverse rotation of the flap has the reverse effect. It is advisable to provide a stop 114a to prevent such operation of the flap as will result in the total shutting off of the air flow to the outer curtain.

FIGURES 29 and 30 are variations of the system shown in FIGURE 28. In these examples, the outer curtain is formed from two ports 116 and 117, fed by two ducts 118 and 119 respectively, the inner curtain being formed from a single port 120 fed by a duct 121. A hinged flap 122 operates to vary the air flow to the two ducts 119 and 121 only, the air flow to the duct 118 being separate. Operation of the flap varies the relative air flow to the two ports 117 and 120 with the above described effect. In FIGURE 29 the ducts 118 and 119 are raised so that air from a compressor flowing along the duct flows smoothly into the duct 121. In FIGURE 30 the ducts 118 and 119 are not raised and a curved guide vane 124 is hinged on the flap 122 to give a smooth entry into the duct 121. There is no need for a limit stop in these latter cases as there is always air flowing to the port 116 for the formation of a curtain.

In the example shown in FIGURE 31 each curtain is formed from two ports, the outer curtain by ports 125 and 126 fed by ducts 127 and 128 and the inner curtain by ports 129 and 130 fed by ducts 131 and 132 respectively. In each pair of ducts the outer duct, 127 and 131, is wider than the inner duct. A hinged valve member 133, formed from two parallel flaps, 133a and 133b, is mounted at the junction of the ducts, movement of the valve member varying the flow of air into the outer duct of each curtain forming system. Air passes between the parallel flaps 133a and 133b into the inner duct 128 of the outer curtain system and flows below the valve into the inner duct 132 of the inner curtain system. The air flow into each of the inner ducts 128 and 132 is virtually unaffected by any movement of the valve member, only the relative flows to the outer ducts 127 and 129 being varied.

In the arrangements shown in FIGURES 28 to 31, where the flap or valve is circular it must be made of flexible material or sectors of stiff material with radial joints of flexible material as shown in FIGURE 32, which is a plan view of a suitable flap for use in FIGURE 29.

It will be understood that in order to produce the moment necessary to effect the trim of the vehicle it is necessary to control the flap valve so that it is deflected at the correct circumferential location or locations. It has been mentioned above that the flap valve must be flexible and it may therefore be deflected by providing a sufficient number of operating levers.

It is an advantage to provide for diversion of air from the inner to the outer curtain at the locality at which the vehicle is to be raised, and from the outer to the inner curtain at the diametrically opposite point, the position of the flap valve varying progressively between the two points. With this in view, a linkage which gives the correct orientation of flap valve position around the vehicle should be provided and such a linkage is shown in FIGURE 33. A ring 134 is mounted in gimbals 135 around the fan casing, the latter being placed centrally in the vehicle. The orientation of the ring 134 is controlled by four hydraulic jacks 136 controlled from the cockpit. Control rods or wires 137 operate the flap valve 122.

FIGURE 34 illustrates diagrammatically an alternative method of varying the relative flows of air to the primary and secondary curtain ports, using a sliding flap or plate. A flat plate 140 is mounted on the bottom surface of the vehicle, arranged to slide inwardly and outwardly over the primary and secondary curtain ports 141 and 142. The ports 141 and 142 are much wider in the radial direction than is normally the case, and the sliding plate 140 is provided with ports 143 and 144 which act as the actual ports through which the curtain forming air issues. The ports 143 and 144 are slightly wider than normal ports, being sufficiently wider for the issue of the maximum additional air than it is intended should be transferred. The ports 143 and 144 are positioned in the plate 140 so that when the plate is in its central position the outer edge of the port 143 is slightly outside the outer edge of the port 141 and the inner edge of port 144 is slightly inside the inner edge of the port 142, the unobstructed widths of the ports 143 and 144 being the correct widths for the formation of normal curtains. Air is fed to the ports via a duct 145 and it will be seen that movement of the plate 140 in or out will vary the relative flows of air out of the ports 143 and 144. Vanes 146 may be provided in the wide ports 141 and 142. Whilst the flat plate is shown as being fitted inside the bottom of the vehicle, it can readily be fitted on the outside, but is liable to be damaged. Again, the relative positionings of the wide and narrow ports can be reversed, the narrow ports 143 and 144 being formed in the bottom of the vehicle and the wide ports 141 and 142 being formed in the sliding plate 140.

The trim of the vehicle may also be varied by altering the position of the primary cushion and/or secondary cushion or cushions relative to the bottom of the vehicle. Thus by moving the position of a cushion sideways, the centre of pressure is moved relative to the centre of gravity of the vehicle and a moment tending to vary the attitude of the vehicle is produced. FIGURES 35 and 36 illustrate such methods.

FIGURES 35a and 35b illustrate diagrammatically a method for moving the position of a port relative to the bottom of a vehicle. The normal narrow port through which the curtain is formed is replaced by a wide port 150. Mounted over the port is a slidable flat plate 151 having a narrow port 152. The port 152 is equivalent to the normal port formed in the bottom of the vehicle in the previously described vehicles, and where the air issuing through it forms the primary curtain, the port 152 is in the form of an annulus or is a series of ports in an annular configuration. As shown in FIGURE 35a, the port 152 is in its central position. By moving the plate in or out, in a generally radial direction, the position of the port and thus the curtain, relative to the centre of the vehicle, can be varied. It will be seen that if the position of the port is altered only on, for example, one side of the vehicle this will have the effect of moving the edge of the cushion. If the port 152 is moved inwards towards the centre of the vehicle, as shown in FIGURE 35b, the edge of the cushion will be moved inwards which will have the effect of moving the centre of pressure of the cushion away from the centre of gravity of the vehicle, towards the side remote from that in which the port 152 has moved and the vehicle will tend to drop on the side where the port 152 has been moved. Vanes, 153, may be provided in the wide port 150.

FIGURES 36a and 36b illustrate a further method of varying the position of a curtain, and thus the edge of a cushion, relative to the centre of the vehicle. The port is in the form of a nozzle 154, the nozzle being annular in form or a series of separate nozzles in an annular configuration. The nozzle 154 is mounted in the bottom of the vehicle so that it projects through the bottom surface of the vehicle and can rotate about a horizontal axis. FIGURE 36a shows the nozzle in its normal position, the curtain 155 issuing in a direction towards the cushion which the curtain is supporting. By rotating the nozzle until it is vertical, as shown in FIGURE 36b the curtain 155 issues vertically and the edge of the cushion will have moved outwards slightly. As explained above, a vertical curtain is not able to support such a high pressure in the cushion as a curtain having an initial direction towards the cushion, both curtains being of the same strength. However, if desired, the weakening effect of moving the nozzle to a vertical direction can be mitigated at least to some extent by arranging for the nozzle to widen as it rotates. It will be seen that with the construction shown in FIGURES 36a and b with the walls of the nozzle pivoted at 156 and 157 to the bottom of the vehicle, some widening of the nozzle does in fact take place as it rotates to a vertical position. Again, the construction of such a nozzle is simple for straight ports, but suitable flexible construction is necessary for curved ports.

Stability and trim control can also be obtained in vehicles in which at least part of the curtain or curtains act horizontally instead of vertically. Such a vehicle is illustrated diagrammatically in FIGURE 37, which shows one end of a vehicle. Side walls 160, with or without curtains from their bottom edges, contain the cushion along the sides of the vehicle. The cushion is contained at each end by two curtains formed from ports 161 and 162 formed in the side walls. In the example shown, the curtains which issue with an initial direction towards the cushion are deflected by the cushion and flow into sets of deflectors 163 which deflect the curtain back towards the cushion, it again being deflected outwards by the cushion, the curtain air eventually escaping to the atmosphere.

In such vehicles having horizontally acting curtains as in FIGURE 37, the zones between the two parallel curtains form secondary cushions which will act to provide stability as described above. Also control and variation of trim in the fore and aft direction can be obtained by varying the relative flows of air to the curtains and by varying the position and/or orientation of the ports, as described above.

As stated above, the compartmentation of the supporting cushion can be obtained, partially or wholly, by the use of a structural member or structural members. Generally the member or members will be positioned so that it or they are parallel to the intended direction of movement of the vehicle, although a flexible construction can be used for a member or members positioned at an angle to the direction of movement, or the member or members may only project downwards a portion of the total cushion thickness, being either rigid or flexible, and a curtain or curtains of fluid may issue from the bottom of the member or members.

FIGURES 38, 39 and 40 illustrate diagrammatically some examples of constructions suitable for compartmenting the cushion. In FIGURE 38 a keel-like member 165 projects downwards from the centre of the bottom of the vehicle. Such a member could replace the fore and aft portion of the secondary curtains which issues from the ports 14 of FIGURE 1. As the member would be parallel to the direction of movement of the vehicle it could be rigid. If however it was desired to replace entirely the secondary curtains together with the ports 14 of FIGURE 1 with structural members, then at least the members replacing those parts of the secondary curtains which are at an angle to the direction of the movement of the vehicle would be at least partially flexible.

FIGURE 39 shows a construction in which the inner secondary curtains are replaced partially by keel-like members 166 which are provided with ports 167 at the bottom edges for the formation of secondary curtains of a reduced height. Such a form of structural member may be used parallel to and at an angle to the direction of movement of the vehicle. The members 166 may be rigid or flexible.

In FIGURE 40 there is shown an example in which the bottom of the vehicle is shaped so as to form the supporting cushion into compartments. In this particular example, the bottom of the vehicle is shaped to form a projection the lowest point 168 of which approaches the surface sufficiently close that the restriction between the lowest point 168 and the surface is effective to enable a pressure difference to occur between the cushion compartments on either side of the restriction. In other examples, the bottom of the vehicle may be shaped to form more than one restriction.

Where the variation of the air flows to the various ports, and/or the moving of the position of a port or ports, is used for varying the trim of a vehicle, this provides a convenient means for maintaining the attitude of the vehicle over obstacles such as rocky ground or waves at sea. Taking as an example, a vehicle travelling over waves at sea, the trimming of the vehicle can be controlled by a simple mechanism, such as a gyroscopically controlled valve so that the vehicle remains on a substantially even keel. The operation is as follows.

When the front of the vehicle meets a wave, which causes a locally reduced height and thus a locally increased pressure rise in the cushion, the vehicle tends to lift at the front. A suitably controlled valve, such as that shown in FIGURE 16 of U.S. Patent No. 3,182,739, detects this rise and varies the flow of air to the curtain, or curtains, at the front, or varies the position of the curtain forming port or ports, so that the cushion pressure is decreased or the centre of pressure moved, in a sense to counteract the lifting tendency caused by the wave. A reverse effect is created when the front end is over a wave trough. Such a trim control can be used to counteract undesirable movements of the vehicle at any point on its periphery. The vehicle thus operates on a substantial even keel and does not have imposed upon it undesirable vertical accelerations due to passing over obstructions.

However, when a vehicle is operating over waves a number of times longer than the length of the vehicle, or over land undulations having characteristics similar to long waves, there is not the same need to maintain the vehicle on an even keel as the vertical accelerations are quite moderate. The vehicle can thus travel at a constant height from the surface following the surface profile.

I claim:

1. A vehicle for hovering or travelling over land and/or water comprising means which in operation produce and contain a pressurised cushion of gas underneath the vehicle for at least partly supporting the vehicle, and means for bringing about a stepped pressure distribution over at least part of the said cushion with the largest pressure situated nearest the centre of the vehicle and the smallest pressure situated nearest the edge of the vehicle.

2. A vehicle for hovering or travelling over land and/or water comprising means which in operation produce and contain a pressurised cushion of gas underneath the vehicle for at least partly supporting the vehicle above the surface over which it is adapted to hover or travel, and means for subdividing the said cushion into a plurality of gas-containing compartments wherein different gas pressures can be produced, at least two of said compartments being positioned along the periphery of said cushion on opposite sides of the fore and aft centre line of the vehicle, and at least two of said compartments being so positioned that their centres of pressure lie on opposite sides of a transverse axis through the centre of gravity of said vehicle.

3. A vehicle as claimed in claim 2 wherein the subdividing means comprises at least one jet of fluid issuing from the underside of the vehicle.

4. A vehicle as claimed in claim 2 wherein the subdividing means comprises at least one structural member on the underside of the vehicle.

5. A vehicle as claimed in claim 2 wherein the subdividing means comprises a combination of at least one structural member and at least one jet of fluid issuing from the underside of the vehicle.

6. A vehicle for hovering or travelling over land and/or water comprising means for causing a fluid to so issue from the lower part of the vehicle as to form and maintain at least one curtain of moving fluid which, together with the structure of the vehicle and the surface over which it is to hover or travel, encloses a gaseous pressurised cushion by which the vehicle is mainly supported, and means for subdividing the said cushion into at least three compartments wherein different pressures can be maintained, at least two of said compartments having their centres of pressure positioned on opposite sides of the transverse centre line of the vehicle.

7. A vehicle for hovering or travelling over land and/or water comprising means for causing a fluid to so issue from the lower part of the vehicle as to form and maintain at least one curtain of moving fluid which, together with the structure of the vehicle and the surface over which it is to hover or travel, encloses a gaseous pressurised cushion by which the vehicle is mainly supported, and means for subdividing the said cushion so that a pressure differential can be set up between different parts thereof, said subdividing means comprising at least one further jet of fluid issuing from the underside of the vehicle.

8. A vehicle for hovering or travelling over land and/or water including means for causing a fluid to so issue from the lower part of the vehicle as to form and maintain at least one inner curtain of moving fluid which, together with the structure of the vehicle and the surface over which it is to hover or travel, encloses a main gaseous pressurised cushion by which the vehicle is mainly supported, and means for forming and maintaining at least one outer curtain of moving fluid spaced from the inner curtain, whereby a secondary cushion of pressure intermediate between that of atmosphere and that of the main cushion is formed between the two curtains.

9. A vehicle as claimed in claim 8, including means for subdividing the secondary cushion into a plurality of compartments.

10. A vehicle as claimed in claim 8, wherein both curtains extend annularly, one within the other.

11. A vehicle as claimed in claim 8, including means for producing a plurality of generally radial jets of fluid whereby the secondary cushion is divided into at least three compartments.

12. A vehicle as claimed in claim 11, wherein the said generally radial jets are formed by blanking off at intervals the port through which the inner curtain-forming jet of fluid issues from the vehicle.

13. A vehicle as claimed in claim 8, wherein the jet of fluid forming the inner curtain issues from the vehicle at an angle to the horizontal of between 30° and 60°.

14. A vehicle as claimed in claim 8 including ports through which the inner and outer curtains issue from the vehicle, the port through which the outer curtain issues being higher with reference to the surface over which the vehicle is to hover or travel than that through which the inner curtain issues.

15. A vehicle as claimed in claim 8 including means for diverting to one of the inner and outer curtains at a selected location a part of the fluid which would otherwise flow to the other curtain, whereby the vehicle is trimmed.

16. A vehicle as claimed in claim 15, wherein the fluid diverting means are so constructed and arranged that a constant amount of fluid is fed to the inner region of each curtain, while the amount flowing to the outer region of each curtain is variable.

17. A vehicle as claimed in claim 16, including means for dividing the fluid feed to each curtain into a duct feeding the inner region and one feeding the outer region, and pivoted members at the upstream end of the duct feeding the inner region of the outer curtain which are linked so as to remain parallel, and together constitute a flap valve for varying the distribution of fluid to the outer regions of the inner and outer curtains respectively.

18. A vehicle as claimed in claim 15, wherein the means for diverting the fluid are so constructed and arranged that, if a location is selected for diverting fluid from the outer curtain to the inner curtain, a like quantity of fluid is at the same time diverted at the diametrically opposite location from the inner curtain to the outer curtain, and fluid is diverted in progressively decreasing amounts from the said diametrically opposite locations to locations separated by an angle of 90° therefrom, no fluid being diverted at the latter locations.

19. A vehicle for hovering or travelling over land and/or water comprising means for causing a fluid to so issue from the lower part of the vehicle as to form and maintain at least one inner curtain of moving fluid which, together with the structure of the vehicle and the surface over which it is to hover or travel, encloses a main gaseous pressurised cushion by which the vehicle is mainly supported, and means for forming and maintaining at least one outer curtain of moving fluid spaced from the inner curtain, whereby a secondary cushion of pressure intermediate between that of atmosphere and that of the main cushion is formed between the two curtains, one of said curtains extending annularly while the other is discontinued at the front and rear sectors of the vehicle, the ends of this curtain at the front and rear on each side of the vehicle being joined to the annular curtain.

20. A vehicle for hovering or travelling over land and/or water comprising means for causing a fluid to so issue from the lower part of the vehicle as to form and maintain an inner curtain of moving fluid which, together with the structure of the vehicle and the surface over which it is to hover or travel, encloses a main gaseous pressurised cushion by which the vehicle is mainly supported, and means for forming and maintaining a plurality of outer curtains of moving fluid having their ends in contact with, and the portions between said ends spaced from, the inner curtain so as to form at least three secondary cushions.

21. A vehicle as claimed in claim 20, wherein the ends of the outer curtains intersect the inner curtain at acute angles, and which includes in the bottom of the vehicle in the area covered by the secondary cushion inlet transfer ports near such intersections and outlet transfer ports at regions where the curtains are fully separated from each other, and ducts connecting the inlet transfer ports with the outlet transfer ports.

22. A vehicle for hovering or travelling over land and/or water comprising means for causing a fluid to so issue from the lower part of the vehicle as to form and maintain at least one inner curtain of moving fluid which, together with the structure of the vehicle and the surface over which it is to hover or travel, encloses a main gaseous pressurised cushion by which the vehicle is mainly supported, means for forming and maintaining at least one outer curtain of moving fluid parallel to and spaced from the inner curtain, whereby a secondary cushion of pressure intermediate between that of atmosphere and that of the main cushion is formed between the two curtains and surrounding the main cushion, and means for producing a plurality of generally radial compartmenting jets of fluid whereby the secondary cushion is divided into at least three compartments, the means for producing each of said compartmenting jets including a chamber which extends in cross-section on either side of the jet and is adjacent to the space containing the secondary cushion, the boundary between the said chamber and space being constituted by a diaphragm which contains two sets of curved vanes situated one on each side of the undeflected jet with the radii of curvature of each set decreasing progressively from that vane on which the jet impinges if undeflected, the diaphragm also being provided with ports connecting the said chamber and space and situated outside the outermost vane of each set of vanes.

23. A vehicle for hovering or travelling over land and/or water comprising means for causing a fluid to so issue from the lower part of the vehicle as to form and maintain at least one inner curtain of moving fluid which, together with the structure of the vehicle and the surface over which it is to hover or travel, encloses a main gaseous pressurised cushion by which the vehicle is mainly supported, and means for forming and maintaining at least one outer curtain of moving fluid spaced from the inner curtain, whereby a secondary cushion of pressure intermediate between that of atmosphere and that of the main cushion is formed between the two curtains, the means for forming the inner curtain including a chamber which extends in cross-section on either side of said curtain and is adjacent to the space below the vehicle in which the main and secondary cushions are formed, the boundary between the said chamber and space being constituted by a diaphragm which contains two sets of curved vanes situated one on each side of the undeflected curtain with the radii of curvature of each set decreasing progressively from that central vane on which the curtain impinges if undeflected, the diaphragm also being provided with ports connecting the said chamber and space and situated outside the said outermost vane of each set of vanes.

24. An aircraft carrier comprising a body having a deck from which aircraft are adapted to be launched, means for propelling the carrier forwardly at a speed at least equal to the minimum flying speed of the aircraft carried thereby, means for holding an aircraft in launching position on said deck, said holding means being releasable to launch the aircraft when the carrier has reached a speed at least equal to the minimum flying speed of the aircraft, means for so discharging at least one jet of fluid from the lower part of said body as to form a curtain of downwardly moving fluid which effectively encloses a space between the underside of said body and the surface over which the carrier is to travel containing a cushion of gas having a built-up pressure sufficient to assist in supporting the carrier out of contact with said surface, said jet discharging means including a continuously extending mouth in the underside of said body which is so formed as to direct the curtain forming jet of fluid inwardly with respect to the area enclosed by said mouth, and additional jet discharging mouths in the underside of said body which are so formed and positioned as to produce curtains of downwardly moving fluid which sub-divide said space into compartments for stabilising the carrier.

25. In an aircraft having a fuselage, a delta wing and engines for imparting forward movement to the aircraft, the combination therewith of means for enabling the aircraft to take-off from or land on a surface substantially vertically comprising a source of moving gas, and means for so discharging said gas from the aircraft as to form a curtain of downwardly moving gas which effectively encloses a space between the underside of said aircraft and said surface containing a cushion of gas having a built-up pressure sufficient to assist in supporting the aircraft out of contact with said surface, said gas discharging means including a peripherally extending mouth in the underside of said delta wing which is so formed as to direct the curtain of gas discharged therefrom inwardly with respect to the area enclosed by said mouth, and a plurality of further mouths subdividing said area from which additional curtains of gas are discharged to subdivide said cushion into a plurality of compartments and thereby provide stability.

26. A vehicle capable of hovering or travelling over and in close proximity to a surface at a height which is small in relation to the size of said vehicle comprising a body, means for discharging a fluid jet downwardly from the lower part of said body in the form of an annular curtain of moving fluid of curved configuration having a component of velocity across the gap existing between said body and said surface, said curtain in combination with said body and said surface effectively enclosing a gas-containing space between the underside of said vehicle and said surface wherein a cushion of gas may be formed and retained having a pressure and a plan area sufficient to support the major part of the weight of the vehicle, the pressure of said cushion causing, and in turn being primarily contained due to, a change of direction of the moving fluid which results in the curved configuration of said curtain, said discharging means being so constructed and arranged that the fluid jet issues therefrom with a direction of flow which makes an angle with a horizontal plane within said gas-containing space of less than 90° at all points around the periphery of said curtain, additional means for discharging fluid in curtain form from the lower part of said body at points within said gas-containing space so as to form compartments in said space for stabilising the vehicle and means for delivering fluid to said discharging means, the power capability of said last-named means being so limited that at all times the thrust produced by said fluid jet as it leaves the vehicle is substantially less than the total weight of said vehicle.

27. A vehicle as claimed in claim 26 wherein said additional means comprises fluid discharging slots in the underside of said vehicle within the ambit of said curtain.

28. A method of supporting a vehicle above and in close proximity to a surface over which the vehicle is to hover or travel comprising the steps of discharging from the lower part of said vehicle at least one curtain of moving fluid which travels across the gap existing between said surface and the body of the vehicle and which, in combination with said body and said surface, effectively encloses a gas-containing space between the underside of said vehicle and said surface, so controlling said discharge that the thrust on said vehicle created by the discharge therefrom of said curtain of moving fluid is at all times substantially less than the weight of the vehicle, producing within said space a cushion of gas having a pressure which, as augmented by whatever vertical component of the thrust of said curtain and whatever aerodynamic lift may be present, is sufficient to support the body of said vehicle at a height above said surface which is small in relation to the size of said vehicle, and forming one or more additional curtains of moving fluid dividing the gas-containing space into a plurality of compartments.

29. A vehicle capable of hovering or travelling over and in close proximity to a surface at a height which is small in relation to the size of said vehicle comprising a body having an intake for fluid, and means for drawing fluid through said intake and causing said fluid to so issue from the lower part of said body as to cause the formation of a plurality of curtains of moving fluid each having a component of velocity across the gap existing between said body and said surface, said curtains in combination with the body of the vehicle and said surface effectively enclosing a plurality of gas-containing spaces between the underside of said vehicle and said surface wherein a plurality of cushions of gas are formed having pressures which are sufficient in relation to the area of the underside of said vehicle on which said pressures act to support the major part of the weight of the vehicle, the plan areas of said pressurised cushions of gas being such that the upward pressure of said gas acts over a total area equal to at least the major part of the underside of the vehicle, and said curtain forming means being so constructed and arranged that the thrust produced by said fluid as it finally leaves the vehicle is at all times substantially less than the total weight of said vehicle.

30. A vehicle capable of hovering or travelling over and in close proximity to a surface at a height which is small in relation to the size of said vehicle comprising a body having an intake for fluid, means for drawing fluid through said intake and causing said fluid to so issue from the lower part of said body as to cause the formation of at least one curtain of moving fluid having a component of velocity across the gap existing between said body and said surface, said curtain in combination with said body and said suface effectively enclosing a gas-containing space between the underside of said vehicle and said surface wherein a cushion of gas is formed having a pressure which is sufficient in relation to the area of the underside of said vehicle on which said pressure acts to support the major part of the weight of the vehicle, the pressure of said cushion causing, and in turn being primarily contained due to, a change of direction of the moving fluid which results in a curvature of said curtain, the plan area of said pressurised cushion of gas being such that the upward pressure of said gas acts over an area equal to at least the major part of the underside of the vehicle, and additional means for so discharging fluid from the lower part of the vehicle as to form at least one additional curtain of fluid dividing the gas-containing space into a plurality of compartments, said curtain forming means being so constructed and arranged that the thrust produced by said fluid as it finally leaves the vehicle is at all times substantially less than the total weight of said vehicle.

31. A vehicle adapted to be stably supported above and in proximity to a surface to be traversed comprising
a vehicle body having a bottom adapted to be vertically spaced above the surface;
nozzle means for discharging a plurality of jet sheets of fluid downwardly from said vehicle to continuously impinge upon the surface and form a plurality of jet sheet walls;
said jet sheet walls defining separate cells between said bottom of said vehicle body and the surface;
said cells each being completely surrounded by said jet sheet walls and including a center cell including the undivided center portion of said bottom of said vehicle body,
and at least three separate cells positioned around the periphery of said center cell,
said center cell including a larger area of said bottom of said vehicle than any one of the separate cells positioned around the periphery of said center cell,
and means on said body for supplying pressurised fluid to said nozzle means and to each of said cells whereby the ffuid pressure of each cell is maintained as an inverse function of the distance between the bottom of said vehicle body included in each of said cells and the surface traversed, and the fluid pressure and the areas of said bottoms of said cells exposed to the fluid pressure are sufficient to sustain the weight of said body above the surface.

32. A vehicle as claimed in claim 31, wherein said separate cells enclose areas of said bottom of said vehicle of substantially equal size.

33. The method of supporting a body, having a substantially airtight undersurface, and above and in close proximity to a pressure-retaining lower surface comprising the steps: emitting air from said body in the form of a downwardly and inwardly-directed jet-like curtain extending substantially parallel to a portion of the periphery of the undersurface and being of sufficient velocity and volumetric flow rate to create between the undersurface and a pressure-retaining lower surface a cushion of air under superatmospheric pressure sufficient to lift the body to a stable elevation above the lower surface; and retarding the flow of air outwardly from between the surfaces along the peripheral portion to which said curtain is substantially parallel by emitting from the body a second downwardly-directed jet-like curtain of air substantially parallel to and spaced outwardly of the first-mentioned curtain.

34. A vehicle adapted to be stably supported above and in proximity to a surface to be traversed comprising a vehicle body having a bottom adapted to be spaced above the surface, means for forming and maintaining a pressurised cushion of gas between the bottom of said vehicle body and the surface, means for subdividing said cushion into a plurality of separate cells, including a center cell including the undivided center portion of said bottom of said vehicle body and at least three separate cells positioned around the periphery of said center cell, said center cell including a larger area of said bottom of said vehicle than any one of the separate cells positioned around the periphery of said center cell, and means on said body for supplying pressurised fluid to each of said cells whereby the fluid pressure of each cell is maintained as an inverse function of the distance between the bottom of said vehicle body included in each of said cells and the surface traversed, and the fluid pressure and the areas of the bottom of said vehicle body within said cells exposed to the fluid pressure are sufficient to sustain the weight of said body above the surface.

35. A vehicle for hovering or travelling over land and/or water comprising means for forming and maintaining a pressurised cushion of gas underneath the vehicle for at least partially supporting the vehicle above the surface over which it is to hover or travel, and means for subdividing said cushion into at least four gas-containing compartments wherein different gas pressures can be produced.

36. A vehicle as claimed in claim 35 wherein said cushion compartments are so distributed with respect to the centre of gravity of the vehicle that the production of different gas pressures in said compartments exerts a righting force on the vehicle which tends to stabilise the vehicle.

37. A vehicle as claimed in claim 35 wherein said cushion compartments are so distributed with respect to the centre of gravity of the vehicle that at least two of said compartments are positioned on opposite sides of the fore and aft centre line of the vehicle, and at least two of said compartments are positioned on opposite sides of a transverse axis through said centre of gravity.

38. A vehicle as claimed in claim 35 wherein two of said cushion compartments are positioned adjacent the front and rear of the vehicle respectively.

39. A vehicle for hovering or travelling over land and/or water comprising means for forming and maintaining a pressurised cushion of gas underneath the vehicle for at least partially supporting the vehicle above the surface over which it is to hover or travel, said means including means for discharging downwardly from the underside of the vehicle a curtain of moving fluid forming at least part of the peripheral boundary of said cushion, and means for subdividing said cushion into a plurality of gas-containing compartments wherein different gas pressures can be produced for stabilising the vehicle.

40. The method of supporting a body, having a substantially airtight undersurface, above and in close proximity to a pressure-retaining lower surface, the steps comprising: emitting air under pressure from and beneath the body to develop between the undersurface and a lower surface a cushion of air under superatmospheric pressure sufficient to lift the body to a stable elevation above the lower surface; and retarding the flow of air outwardly from between the surfaces along at least a portion of the periphery of the undersurface by emitting from the body a downwardly-directed jet-like curtain of air extending along the peripheral portion of the undersurface, and spaced outwardly of the location where the air was emitted to develop the cushion.

References Cited

UNITED STATES PATENTS

| 2,483,663 | 10/1949 | Nowak | 180—1 |
| 2,567,392 | 9/1951 | Naught | 180—1 |
| 2,838,257 | 6/1958 | Wibault | 180—1 |
| 2,842,084 | 7/1958 | Williams | 180—1 |
| 2,922,277 | 1/1960 | Bertin | 180—1 |
| 2,939,649 | 6/1960 | Shaw | 180—1 |

FOREIGN PATENTS

| 3,117,644 | 1/1964 | Great Britain. |
| 3,181,636 | 5/1965 | Great Britain. |
| 3,182,739 | 5/1965 | Great Britain. |
| 3,182,740 | 5/1965 | Great Britain. |
| 3,213,956 | 10/1965 | Great Britain. |

OTHER REFERENCES

"Remarks on the Ground-Effect Machine," by G. D. Boehler, presented at the Fifth Annual Western Forum of the American Helicopter Society, Sept. 25, or 26, 1958.

David Taylor Model Report, "Preliminary Tests of a Two-Foot Diameter Annular Jet Vehicle," April 1959; p. 1 and FIG. 2 relied on.

A. HARRY LEVY, *Primary Examiner*